United States Patent [19]
Schock

[11] 4,219,304
[45] Aug. 26, 1980

[54] WATER TURBINE

[76] Inventor: Samuel S. Schock, 6760 Norcross Rd., R.R. #4, Duncan, British Columbia V9L 3W8, Canada

[21] Appl. No.: 940,774

[22] Filed: Sep. 8, 1978

[51] Int. Cl.² ............................................ F01D 25/28
[52] U.S. Cl. ............................................ 415/7; 114/61; 114/121; 416/85; 290/54
[58] Field of Search .................... 290/53, 42, 43, 54; 114/61, 270, 140, 26, 121, 37, 38, 39; 60/398, 499, 501; 416/DIG. 4, 85, 176, 41; 415/7

[56] References Cited

U.S. PATENT DOCUMENTS

| | | | |
|---|---|---|---|
| 655,994 | 8/1900 | Riess | 114/140 |
| 1,338,890 | 5/1920 | Wilber | 416/85 |
| 1,595,949 | 8/1926 | Kirin | 114/140 |

FOREIGN PATENT DOCUMENTS 98090  5/1924  Fed. Rep. of Germany ............ 416/85

*Primary Examiner*—Sherman D. Basinger

[57] ABSTRACT

This turbine is pontoon supported on a body of water, and it consists primarily of a pair of angularly disposed and spaced-apart rotors, which when in operation, will cause a minimal amount of injury to the environment, as concerning marine life and land surface flooding. The structure of this device is such, that water flow below it has a suction effect, which draws the surface water along, thus causing the surface water to build against the rotors, so the water proceeds to flow between the rotors, which thereby increases its power generating potential.

2 Claims, 3 Drawing Figures

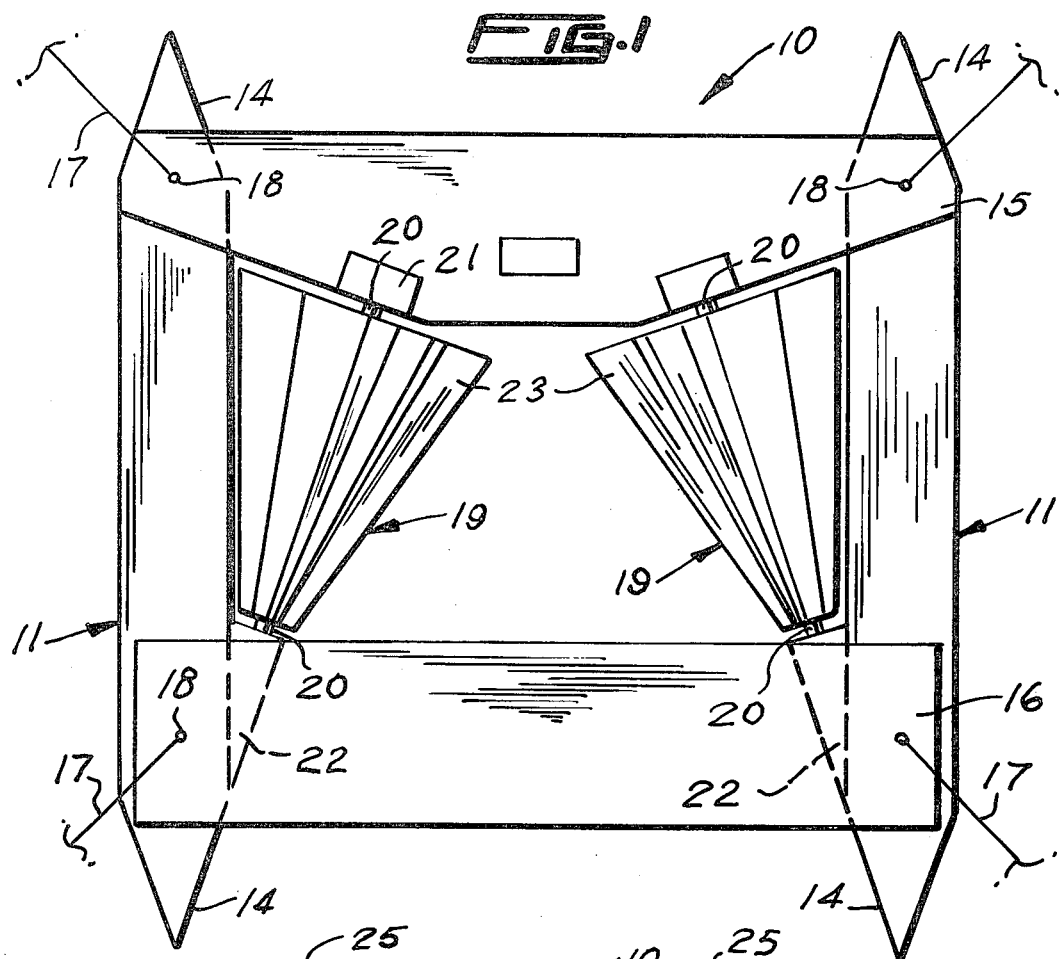
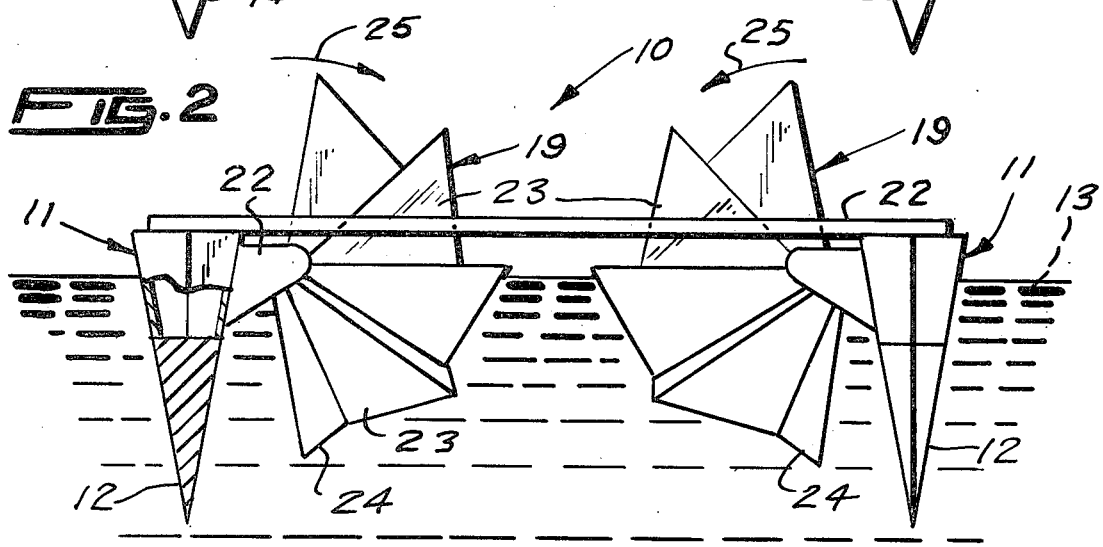

WATER TURBINE

This invention relates to turbines, and more particularly, to a water turbine.

It is therefore the principal object of this invention, to provide a water turbine, which will generate greater useful power than those of the prior art.

Another object of this invention is to provide a water turbine, which will extract energy from water as it flows from a higher elevation to a lower elevation, in its effort to achieve a common level, and it will accomplish the aforementioned, with a minimum amount of injury to the environment, such as concerning marine life and land surface flooding.

A further object of this invention is to provide a water turbine, which will be of such structure, that the water flow below the turbine, will have a suction effect, which draws the surface water along, causing the surface water to build against the rotors, as the water proceeds to flow between the rotors, thereby increasing the power generating potential, and any one of a number of transmission systems may be employed, to transfer the energy from the shafts of the rotors of the turbine.

A still further object of this invention is to provide a water turbine, which will be ideally suited to operate slow speed, direct current generators, to generate electricity for the electrolysis of water, which is in abundant supply, into its component elements, hydrogen and oxygen, which can then be converted into electricity on demand by an item known as a fuel cell.

In tide-ways, a turntable installation of the present invention would make possible a 180 degree set up, thereby generating power with the incoming tide, and the outgoing tide.

In time of war, electric generating systems, (hydro, nuclear power, fossil fueled), are prime targets for enemy attack, and such attacks, if successful, would result in a great loss of life and property. The present invention makes possible a greater dispersion of electric generating facilities, with the only casualty being the turbine, should it be the subject of a direct hit.

Other objects of the present invention are to provide a water turbine, which will be simple in design, inexpensive to manufacture, rugged in construction, easy to install, and efficient in operation.

These, and other objects of the invention, will become readily evident, after a study of the following specification, and the accompanying drawing, wherein:

FIG. 1 is a top plan view of the present invention;

FIG. 2 is a fragmentary front view of FIG. 1, shown in the water and partly broken away, and FIG. 3 is an end view of one of the rotors of the invention, shown in elevation.

According to this invention, a turbine 10 is shown to include a pair of parallel spaced-apart pontoons 11, having a ballast 12 fixedly secured to the bottoms thereof, for stability in the water 13. The ends 14, of pontoons 11 are pointed for the smooth flow of water thereby, and a pair of parallel spaced-apart platforms are fixedly secured to the top of pontoons 11, in a suitable manner. Anchor lines 17 are secured to the platforms 15 and 16, by suitable fastener means 18, so as to render turbine 10 stationary on a body of flowing water 13.

A pair of conically configurated and spaced-apart rotors 19 include a shaft 20, which extends from each end, and is the longitudinal axis of rotors 19, and the ends of shafts 20 are journaled within bearing support members 21 and 22 of turbine 10. The vanes 23, of rotors 19, are of tapered configuration, with the edges 24 angularly disposed thereof, and as will be readily seen in FIG. 2, the bottom portions are submerged, so as to be driven by the water flow 13.

It shall be noted, that the rotors 19 are counter-rotatable with each other, as shown by the arrows 25.

It shall further be noted, that massive dam projects are not a prerequisite for the installation of water turbine 10.

As shown in FIG. 3, the point 26 is illustrated as being in a leading position, relative to point 27, for maximum effect in generating power.

While various changes may be made in the detail construction, it will be understood that such changes will be within the spirit and scope of the present invention, as is defined by the appended claims.

What I now claim is:

1. A water turbine, comprising, in combination, a pair of parallel, spaced-apart pontoons, providing flotation means for a pair of rotors of conical configuration, which are partly submerged in a body of flowing water, and platform means is secured to said pair of parallel, spaced-apart pontoons, for supporting bearing support members of said pair of rotors; said parallel, spaced-apart pontoons include ballast means secured fixedly in the bottom thereof, for stability upon the surface of water, and the bottom surface of said platform means is fixedly secured to the top surface of said pair of parallel, spaced-apart pontoons; anchor lines being secured by suitable fastener means to the end portions of said platform means, which are a pair, that are parallel spaced-apart, and said bearing support members of said rotors are secured, both, to a side of said parallel, spaced-apart pontoons and to one of said platform means, and the ends of the shafts of said rotors are journaled within said bearing support members.

2. The combination according to claim 1, wherein said pair of conical configurated rotors are spaced between said pair of parallel, spaced-apart pontoons, and are angularly disposed of each other.

* * * * *